United States Patent
Rodriguez et al.

(10) Patent No.: US 8,243,722 B2
(45) Date of Patent: Aug. 14, 2012

(54) VOIP ANALOG TELEPHONE SYSTEM

(75) Inventors: Mark F. Rodriguez, North Miami, FL (US); Anastasios Takis Kyriakides, North Miami, FL (US); Kenneth Hosfeld, North Miami, FL (US); Leo Manzewitsch, North Miami, FL (US)

(73) Assignee: Net Talk.com, Inc., Miami, FL (US)

( * ) Notice: Subject to any disclaimer, the term of this patent is extended or adjusted under 35 U.S.C. 154(b) by 74 days.

(21) Appl. No.: 12/366,851

(22) Filed: Feb. 6, 2009

(65) Prior Publication Data

US 2009/0141708 A1 Jun. 4, 2009

(51) Int. Cl.
*H04L 12/66* (2006.01)
(52) U.S. Cl. ......... 370/352; 370/463; 370/252; 370/401
(58) Field of Classification Search .......... 370/352–356, 370/463, 252, 401
See application file for complete search history.

(56) References Cited

U.S. PATENT DOCUMENTS

| | | | |
|---|---|---|---|
| 7,372,851 B2 * | 5/2008 | Boutboul | 370/356 |
| 7,463,615 B2 | 12/2008 | Vassilovski et al. | |
| 7,596,124 B2 * | 9/2009 | Brenes et al. | 370/338 |
| 8,125,999 B2 * | 2/2012 | Yasrebi et al. | 370/401 |
| 2005/0105512 A1 * | 5/2005 | Myhre et al. | 370/352 |
| 2005/0271029 A1 * | 12/2005 | Iffland | 370/348 |
| 2006/0077968 A1 * | 4/2006 | Pitsoulakis et al. | 370/352 |
| 2006/0171378 A1 * | 8/2006 | Harris et al. | 370/352 |
| 2006/0187904 A1 * | 8/2006 | Oouchi | 370/352 |
| 2007/0140262 A1 * | 6/2007 | Wang | 370/395.52 |
| 2007/0286173 A1 * | 12/2007 | Li et al. | 370/356 |
| 2008/0056245 A1 * | 3/2008 | Boutboul | 370/356 |
| 2008/0112392 A1 * | 5/2008 | Mansfield | 370/352 |
| 2009/0323673 A1 * | 12/2009 | Gabbay et al. | 370/352 |

* cited by examiner

*Primary Examiner* — Kwang B Yao
*Assistant Examiner* — Candal Elpenord
(74) *Attorney, Agent, or Firm* — Malin Haley DiMaggio Bowen & Lhota, P.A.

(57) ABSTRACT

A multi-port VoIP telecommunications system that allows the user to gain access to telephone connectivity through the Internet by connecting directly to the Internet or by connecting to the Internet through the existing Internet connection of a computer or cell phone device. The present system includes an Ethernet port, a Wi-Fi receiver to facilitate the transmission and receipt of Internet protocol signals wirelessly, and a USB plug connectable to the ATA.

3 Claims, 4 Drawing Sheets

VOIP ANALOG TELEPHONE SYSTEM

BACKGROUND OF THE INVENTION

1. Field of the Invention

This invention relates to a telecommunications system for personal phones or residential users that enables Voice over Internet Protocol (VoIP) telephony and facsimile services, and more specifically to a multi-port VoIP telephone system that allows the user to gain access to telephone connectivity through the Internet and utilize an analog telephone handset by transmitting through a device that is connected to the Internet by using an USB (Universal Serial Bus) port of a computer already connected to the internet or by connecting directly to the Internet via an RJ 45 port (or Ethernet port) or an existing Wi-Fi network or any other way to get connected to the Broadband Internet such as Wireless 3G (Third Generation) Services or Bluetooth (the short range wireless connectivity standard).

2. Description of Related Art

Land line telephone systems that include telephone handsets with wiring that goes through a publicly switched telephone network (PSTN) with a central office for switching are well known in the prior art. The basic technology behind how these systems are delivered has not changed much since its inception. Besides the fact that each individual phone set must be wired to be connected directly to each other individual handset during the telephone communication, the circuit is connected between both of the handsets and through the central office switch board during the conversation.

Wireless telephony, which includes the use of wireless handsets and networks of cellular antennas, has increased immensely. This has allowed telephone users to connect to each other wirelessly from virtually any location that has access to a cellular network.

VoIP is a general term for a family of transmission technologies for delivery of voice communications over the Internet or other packet-switch networks. Other terms whose meaning is synonymous include IP telephony, Internet telephony, voice over broadband, broadband telephony, and broadband phone, all of which are used when network connectivity is available over broadband internet access. VoIP systems typically interface with traditional PSTN, allowing for transparent telephone communications world wide.

Typically, phones using a VoIP service can work from almost anywhere when connected to a computer that is accessing the Internet. However, some IP networks can be inherently unreliable and not provide a mechanism to ensure that data packets are delivered in sequential order. This can cause problems such as mitigating latency and jitter. Other problems can arise in channel routing VoIP traffic through firewalls and address translators.

In the last few years, VoIP services have begun to be marketed commercially. These services have become more feasible in large part because of the increased availability of broadband internet access. Subscribers to these VoIP services are able to make and receive calls as they would over a traditional PSTN. Full service VoIP phone companies provide inbound and outbound calling with direct inbound dialing.

In one VoIP scenario, an analog telephone adapter (ATA) is connected to and accesses the Internet through a computer with a broadband Internet connection and an existing telephone jack in order to provide service that is very similar to traditional PSTN. This service is typically offered by broadband internet service providers such as cable companies and telephone companies as a cheaper flat rate telephone service.

Another VoIP scenario involves using the signaling protocol Session Initiation Protocol (SIP). SIP is widely used for setting up and tearing down multimedia communication sessions such as voice and video calls over the internet. SIP can be used for creating, modifying, and terminating two party or multi-party sessions consisting of one or more media streams. A motivating goal for SIP was to provide a signaling and call set up protocol for IP based communications that can support a superset of the call processing functions and features present in the PSTN. It is designed to enable the construction of and various functionalities within network elements designated proxy servers and user agents that permit familiar telephone like operations such as dialing a number, causing a phone to ring, hearing ring back tones, or busy signal.

A primary limitation of existing VoIP systems is that they must use a computer in order to establish the requisite connection to the Internet.

What is needed is a VoIP analog telephone system for personal phones and residential users that allows the user to gain access to telephone connectivity by transmitting through the USB port of a computer or other device that is connected to the Internet or by connecting directly to the Internet via an RJ 45 port or an existing Wi-Fi network.

SUMMARY OF THE INVENTION

A multi-port VoIP analog telephone system for connecting personal phones and residential users that includes telephony and facsimile services comprising a conventional telephone or facsimile machine which includes a telephone jack and an ATA device that includes an RJ 45 port and at least one USB port and is connected to the telephone jack. The ATA device can be connected to a computer, a broadband modem through a RJ 45 port or a Wi-Fi router, allowing it to connect to the internet.

In its most basic setup, the system comprises the traditional analog telephone or facsimile machine connected to an ATA. The ATA is powered through its USB port either though a connection to a computer or through power adapter. The ATA can access the Internet directly through an RJ 45 port built in or indirectly by connecting through the ATA's USB port to a computer that is connected to the Internet or a device with access to the Internet through a cell phone network.

In a more advanced setup, the ATA hardware can be supplemented so that the ATA can access to the Internet wirelessly through a Wi-Fi network (or WiMax, or other standard wireless Internet networks) that is locally available or by a Bluetooth wireless connection to a computer already connected to the Internet.

The basic platform for the system includes a central processor, a storage medium, a memory source, a network interface card (NIC), a USB pot, an Internet input, a RJ 11 port (or any telephone port), and a reset switch which is included with an LED. The USB port can be used to input a power source, an Internet connection, or both. CODEC and SLIC circuitry is connected to the processor. The platform also includes an RJ 45 connector and RJ 11.

The user can gain access to telephone connectivity either through the USB port of any computer or cell phone like devices with Internet access, through an RJ 45 port connected to a switch, modem, or router without the need of a computer, or via a built-in Wi-Fi receiver without the need for a computer connection. The wireless connection through cell phone like devices can be through a GSN, EVDO, CODMA, and/or WIMAX network or other wireless networks.

The system also has an option for onboard dialers, ringtones, ring light, port inter phase for normal and/or Bluetooth auto input/output that completely eliminates the need for an external analog telephone device if the user so desires.

The ATA uses a SIP protocol hosted locally to provide the telephony functionality. The telephone system includes normal features such as call hold, call transfer with or without consultation, call waiting, three party conference, call forwarding, do not disturb, speed dial, repeat dial on busy, caller ID number and name, caller ID block, anonymous call rejection, configurable country tones, distinctive ring, hot line, call hunting between extension, speed dial of ten numbers and address, message wait indication, visual message waiting indication, configurable hook flash, adaptive jitter buffer, facsimile (transparent and facsimile relay), 411information, and advanced voice security features such as RTP.

The system itself is plug-in-play and may have a CD that will help to install drivers on the computer connected to the Internet. The multi-port functional approach is also plug-in-play. The telephone functionality is auto configured and the ATA will take the user configuration from the network. The user sets the user account from a web page. The ATA can be identified by its MAC address and/or a serial number that can be electronically webbed.

It is an object of this invention to provide a VoIP analog telephone system that can be connected to the Internet either directly or indirectly, with the ability to use several means of connecting to establish telephone communications.

It is another object of this invention to provide a VoIP telephone system for personal telephone use that allows for connection to a computer through the USB port wherein the computer does not need an SIP application in order to allow clean computer sharing.

It is another object of this invention to provide a VoIP telephone system that provides unlimited calls to fixed phones throughout the United States, prepaid premium phone features, and VoIP service with any fixed phone, all while using an analog telephone headset.

In accordance with these and other objects which will become apparent hereinafter, the instant invention will now be described with particular reference to the accompanying drawings.

DETAILED DESCRIPTION

Figure 1:
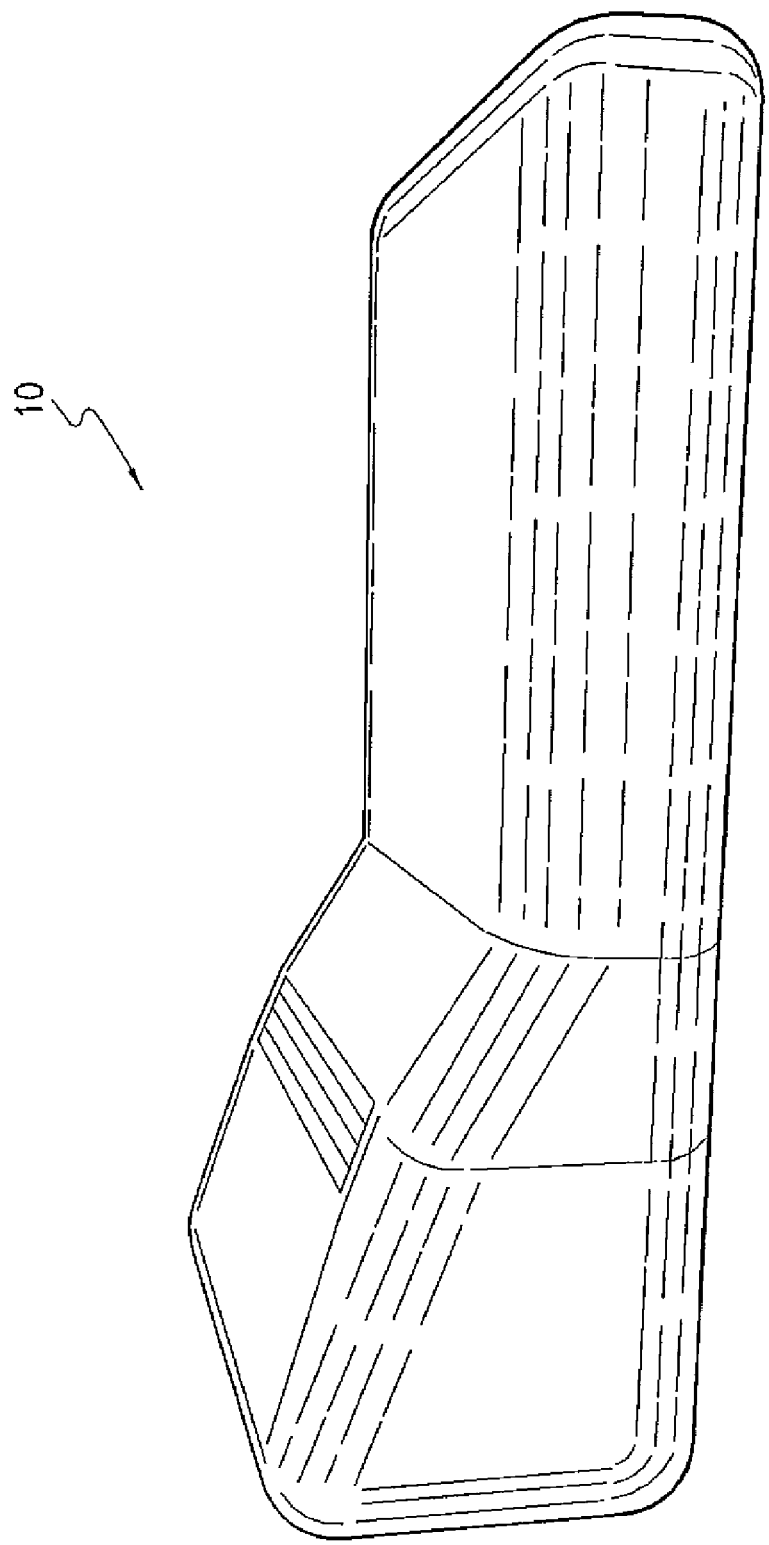
FIG. 1 shows a perspective view of the present invention.
Figure 2:
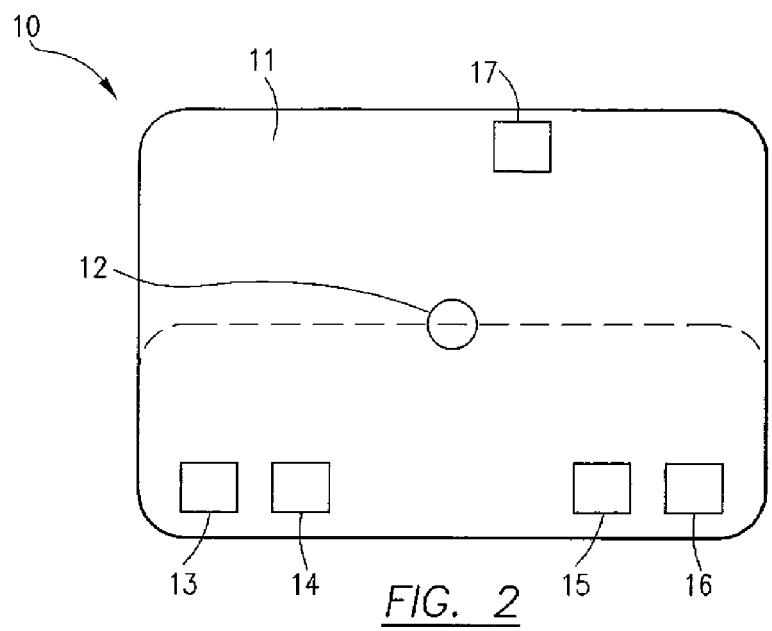
FIG. 2 shows a block diagram of the connections used in the present invention.
Figure 3:
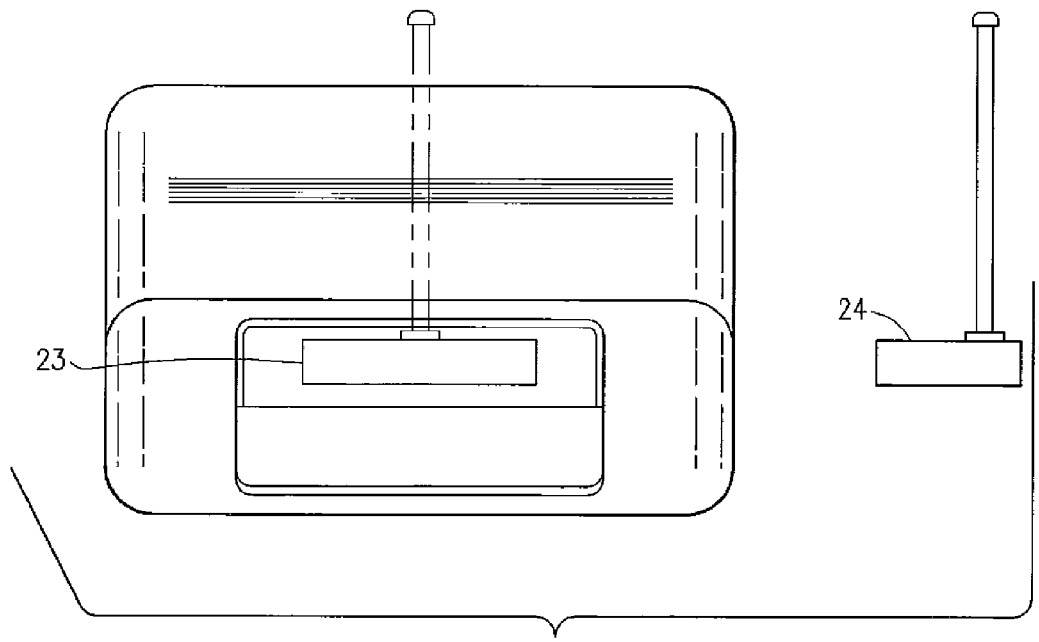
FIG. 3 shows a block diagram of the connections used in the present invention.

Referring now to the drawings and, in particular, FIGS. 1 through 3 the heart of the present invention is the ATA 10, which is a rigid device with a tall end 11 and a short end 20. The tall end 11 houses several of the ports that are needed to enable the numerous functions of the invention. An LED light 12 provides a visual display of the current power and operational state of the ATA 10. The reset button 17, when depressed by a user, shuts down and then immediately restarts the ATA 10. Two USB ports 13, 14 perform the function of providing data input/output as well as power input to the device. An Ethernet port 15 allows an Ethernet cord to be directly connected to the ATA 10 so that the invention can be used without a computer with Internet access. The telephone jack 16 is where the ATA 10 can receive a connection from an analog telephone handset.

The short end 20 of the invention contains a Wi-Fi adapter port 23. In order to enable the ATA 10 to employ a Wi-Fi Internet connection to utilize VoIP service, a Wi-Fi adapter 24 must be inserted into the Wi-Fi adapter port 23. When the Wi-Fi adapter 24 is fully engaged with the Wi-Fi adapter port 23, the ATA will search for available Wi-Fi networks and connect to an available Wi-Fi network.

Figure 4:
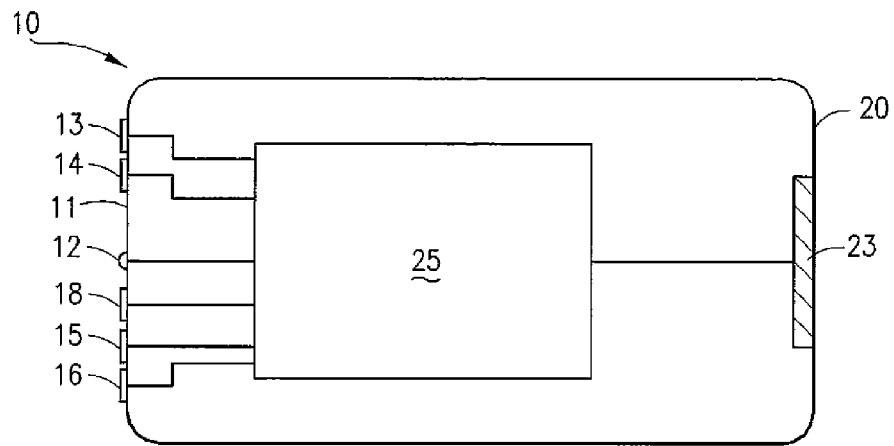
FIG. 4 shows a top plan view of the connections used in the present invention.

Referring now to FIG. 4, the control circuitry 25 in the ATA 10 contain several key components, all of which is mounted on to a platform. The heart of the circuitry components is the central processor 25. The ATA 10 also requires a random access memory component, an NIC component, and a storage medium component. In addition, the storage medium will contain the necessary software to perform the basic VoIP operations, including CODEC, SLIC, and SIP. Each of these components connect work through the processor and the various ports depending upon a particular input from the Internet and output to the Internet that will be achieved from the physical connection to an analog telephone handset.

Figure 5:
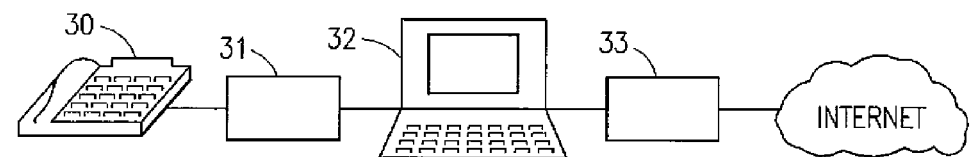
FIG. 5 shows a schematic diagram of the preselt invention using a USB connection to a computer.

Referring now to FIG. 5, the basic telephone VoIP system is shown that includes an analog telephone handset 30 as one would find in the conventional residence or even commercially. The analog telephone handset 30 is connected to the ATA 31 through the ATA's 31 telephone port (RJ 11 or compatible). The ATA 31 is shown connected to a computer 32 through a USB cord that is connected to the computer 32 and to the USB port on the ATA 31. The computer 32 is shown wired to a modem 33 (or router, modem/router combination device and/or a switch), which the computer is using to obtain access to the Internet. The ATA 31 receives power and accesses the Internet through the computer's 32 existing power supply and Internet access and is able to provide VoIP service through the computer's 32 Internet connection. When the VoIP system is configured in this way, a user is able to place and receive telephone calls nationwide without the analog telephone headset 30 being wired through a PSTN.

Figure 6:
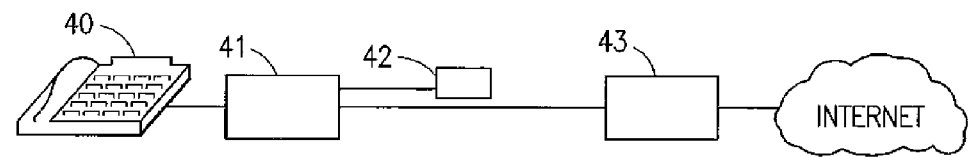
FIG. 6 shows a schematic diagram of the present invention using an Ethernet connection.

Referring now to FIG. 6, the VoIP system that does not require a computer is shown that includes a basic analog telephone handset 40. The analog telephone handset 40 is connected to the ATA 41 through the ATA's 41 telephone port (RJ 11 or compatible). The ATA 41 is shown connected to a USB electric plug adapter 42 through a USB cord that is plugged into one of the ATA's 41 USB ports. The USB electric plug adapter 42 allows the ATA 41 to receive electrical power without a computer connection. The ATA 41 is also shown connected directly to a modem 43 (or router, modem/router combination device and/or a switch) with a Ethernet cord (RJ 45 or compatible) plugged into its Ethernet port. This allows the ATA 41 to access the Internet through the modem 43 without a computer connection. The ATA 41 is able to utilize a direct connection to the Internet through the ATA's 41 NIC component, which is similar to the NIC component found in computers. When the VoIP system is configured in this way, a user is able to place and receive telephone calls nationwide without the analog telephone handset 40 being wired through a PSTN and even without a wired connection to a computer.

Figure 7:
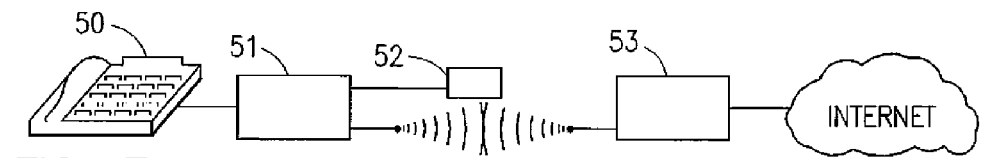
FIG. 7 shows a schematic diagram of the present invention using a Wi-Fi connection.

Referring now to FIG. 7, the VoIP system that does not require a computer is shown that includes a basic analog telephone handset 50. The analog telephone handset 50 is connected to the ATA 51 through the ATA's 51 telephone port (RJ 11 or compatible). The ATA 51 is shown connected to a USB electric plug adapter 52 through a USB cord that is plugged into one of the ATA's 51 USB ports. The USB electric plug adapter 52 allows the ATA 51 to receive electrical power without a computer connection. The ATA 51 is also shown exchanging wireless signals with a wireless router 53. This facilitates the ATA 51 to access the Internet wirelessly through the wireless router 53 without a computer connection or even a wired connection to a modem, router, modem/router combination device and/or a switch. The ATA 51 is able to connect to the wireless signal through the ATA's 51 Wi-Fi adapter and the ATA 51 utilizes the connection to the Internet through the ATA's 51 NIC component, which is similar to the NIC component found in computers. When the VoIP system is configured in this way, a user is able to place and receive telephone calls nationwide without the analog telephone handset 50 being wired through a PSTN and even without the a wired connection to a computer or a modem.

Figure 8:
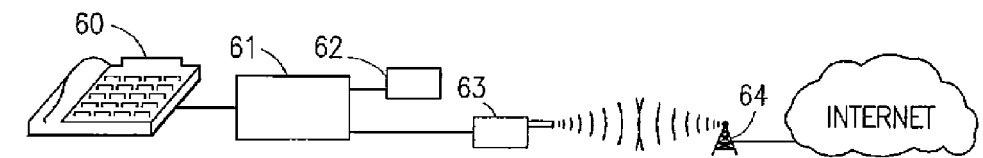
FIG. 8 shows a schematic diagram of the present invention using a USB connection to a cell phone.

Referring now to FIG. 8, the VoIP system that does not require a computer is shown that includes a basic analog telephone handset 60. The analog telephone handset 60 is connected to the ATA 61 through the ATA's 61 telephone port (RJ 11 or compatible). The ATA 61 is shown connected to a USB electric plug adapter 62 through a USB cord that is plugged into one of the ATA's 61 USB ports. The USB electric plug adapter 62 allows the ATA 61 to receive electrical power without a computer connection. The ATA 61 is also shown connected to a cell phone 63 through a USB cord that is plugged into one of the ATA's 61 USB ports. When configured in this manner, the ATA 61 can access the Internet through the cell phone's 63 Internet connection. Generally, it is through a cell phone's 63 connection to the cell phone tower 64, whether the connection is of a GSM, CDMA, or EVDO standard, that the cell phone is able to obtain access to the Internet. However, the ATA 61 can also access the Internet through the cell phone 63 if the cell phone is connecting to the Internet through an available Wi-Fi or WIMAX signal.

Either way, this configuration provides the most flexibility in terms of location and facilitates the ATA 61 to access the Internet wirelessly cell phone 63 without a computer connection, a wired connection to a modem, router, modem/router combination device and/or a switch, or even a nearby Wi-Fi signal. When the VoIP system is configured in this way, a user is able to place and receive telephone calls nationwide without the analog telephone handset 60 being wired through a PSTN and even without the a wired connection to a computer or a modem, or even a WLAN nearby.

Figure 9:
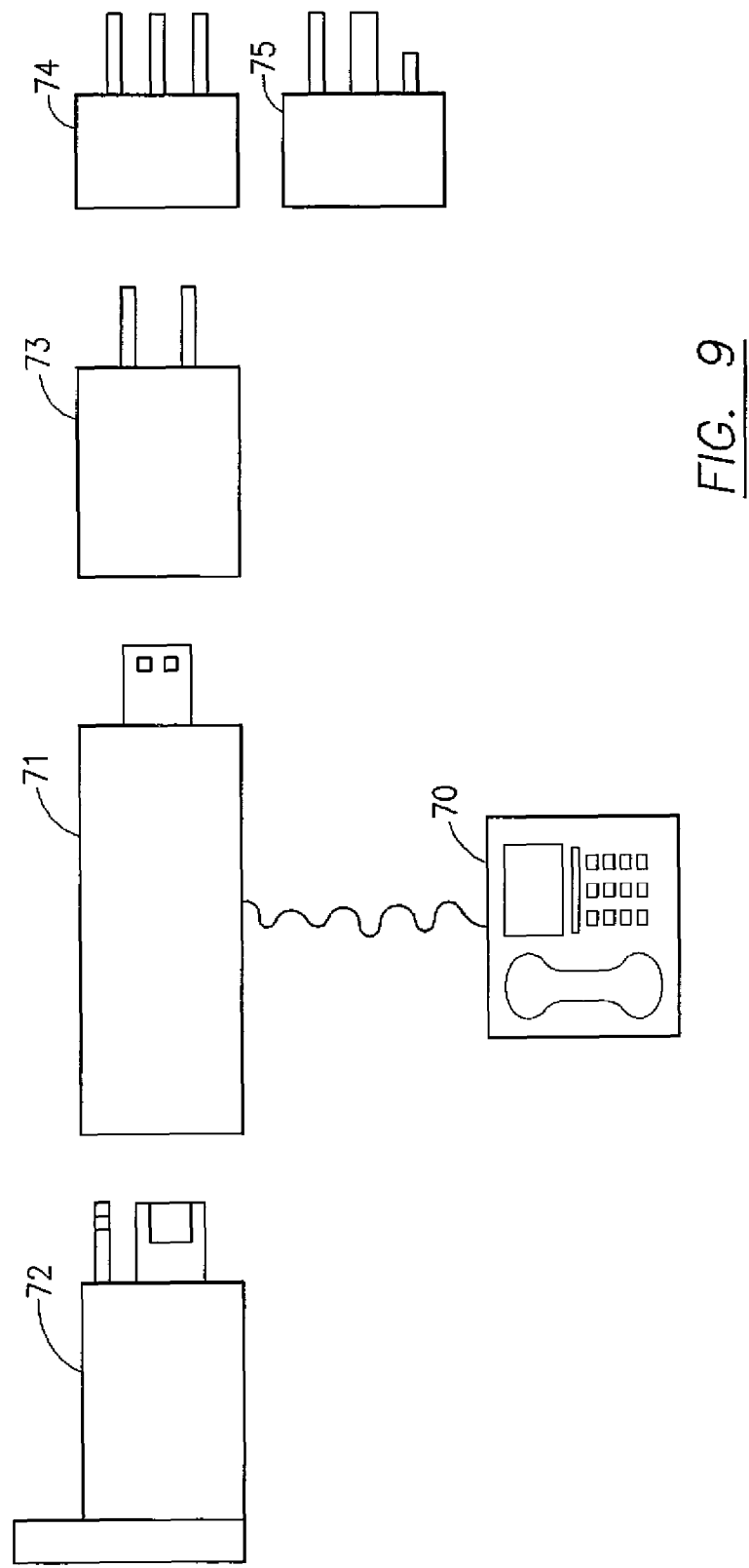
FIG. 9 shows a schematic exploded diagram of the present invention with power connector adapters and power adapters

Referring now to FIG. 9 the system is shown set up to have the analog phone 70 connected to ATA 71 to include the WI-FI device 72 and a series of power adapters 73, 74, and 75 which are power connector adapters.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A Voice over Internet Protocol (VoIP) telephone system that enables VoIP telephony and facsimile services allowing a user to gain access to telephone connectivity between an analog handset telephone and the internet, said system having multiple separate and independent internet access connections for connecting to the internet, each separate internet connection selectable by the user comprising:

an analog telephone for transmitting and receiving sound;

an analog telephone adapter (ATA) comprising a rigid housing, said housing containing a central processor, a non-transitory storage medium, a memory source, a network interface card (NIC), said ATA housing having at least one USB port, an Internet input, and a telephone port;

said analog telephone connected to said ATA telephone port for transmission and receipt of electronic signals from the ATA;

said ATA being configured to optionally be connected by a user to either a first internet access connection or a second different internet access connection or third different internet access connection and to a switched telephone network through the internet such that it can transmit and receive telephone calls;

said system having said first internet access connection including said ATA connected to a computer, a USB cord connected to said computer and to said USB port in said analog telephone adapter, a modem connected to said computer, and said modem connected to said internet;

said system having said second different internet access connection including said ATA connected to a USB electronic plug adapter, a USB plug cord connected to said USB plug adapter and said analog telephone adapter (ATA) USB port, an Ethernet cord, a router connected directly or indirectly to said Ethernet cord, said analog telephone adapter connected to said Ethernet cord, said modem connected to said internet, said analog telephone adapter powered by said USB plug adapter; and said system having said third different internet access connection including said ATA connected to a wireless router connected to the internet, Wi-Fi adapter connected to said analog telephone adapter including the analog telephone adapter NIC component, a USB electric plug adapter connected to said analog telephone adapter to provide power; and whereby a user of said analog telephone can call other telephone handset users over the internet using said first internet access connection or said second internet access connection or said third internet access connection using said ATA.

2. A VoIP system as in claim 1, including:

a fourth internet access connection;

said system fourth internet access connection including a cell phone connected to the internet, a USB cord, analog telephone adapter connected to said cell phone with said USB cord, a USB electric plug adapter connected to said analog telephone adapter.

3. A Voice over Internet Protocol (VoIP) telephone system that enables VoIP telephony and facsimile services allowing a user to gain access to telephone connectivity between an analog handset telephone and the internet, said system having multiple separate and independent internet access connections for connecting to the internet, each separate internet connection selectable by the user comprising:

an analog telephone for transmitting and receiving sound;

an analog telephone adapter (ATA) comprising a rigid housing, said housing containing a central processor, a non-transitory storage medium, a memory source, a network interface card (NIC), said ATA housing having at least one USB port, an Internet input, and a telephone port;

said analog telephone connected to said ATA telephone port for transmission and receipt of electronic signals from the ATA;

said ATA being configured to optionally be connected by a user to either a first internet access connection or a second different internet access connection and to a switched telephone network through the internet such that it can transmit and receive telephone calls from other telephone handsets;

said system having said first internet access connection including said ATA connected to a computer, a USB cord connected to said computer and to said USB port in said analog telephone adapter, a modem connected to said computer, and said modem connected to said internet;

said system having said second different internet access connection including said ATA connected to a USB electronic plug adapter, a USB plug cord connected to said USB plug adapter and said analog telephone adapter (ATA) USB port, an Ethernet cord, a router connected directly or indirectly to said Ethernet cord, said analog telephone adapter connected to said Ethernet cord, said modem connected to said internet, said analog telephone adapter powered by said USB plug adapter; and whereby a user of said analog telephone can call other telephone handset users over the internet using said first internet access connection or said second internet access connection using said ATA.

\* \* \* \* \*

(12) EX PARTE REEXAMINATION CERTIFICATE (10062nd)
United States Patent
Rodriguez et al.

(10) Number: US 8,243,722 C1
(45) Certificate Issued: Feb. 27, 2014

(54) VOIP ANALOG TELEPHONE SYSTEM

(75) Inventors: Mark F. Rodriguez, North Miami, FL (US); Anastasios Takis Kyriakides, North Miami, FL (US); Kenneth Hosfeld, North Miami, FL (US); Leo Manzewitsch, North Miami, FL (US)

(73) Assignee: Net Talk.com, Inc., North Miami, FL (US)

Reexamination Request:
No. 90/012,634, Sep. 14, 2012

Reexamination Certificate for:
Patent No.: 8,243,722
Issued: Aug. 14, 2012
Appl. No.: 12/366,851
Filed: Feb. 6, 2009

(51) Int. Cl.
*H04L 12/66* (2006.01)

(52) U.S. Cl.
USPC ............ 370/352; 370/463; 370/252; 370/401

(58) Field of Classification Search
None
See application file for complete search history.

(56) References Cited

To view the complete listing of prior art documents cited during the proceeding for Reexamination Control Number 90/012,634, please refer to the USPTO's public Patent Application Information Retrieval (PAIR) system under the Display References tab.

*Primary Examiner* — William H. Wood

(57) ABSTRACT

A multi-port VoIP telecommunications system that allows the user to gain access to telephone connectivity through the Internet by connecting directly to the Internet or by connecting to the Internet through the existing Internet connection of a computer or cell phone device. The present system includes an Ethernet port, a Wi-Fi receiver to facilitate the transmission and receipt of Internet protocol signals wirelessly, and a USB plug connectable to the ATA.

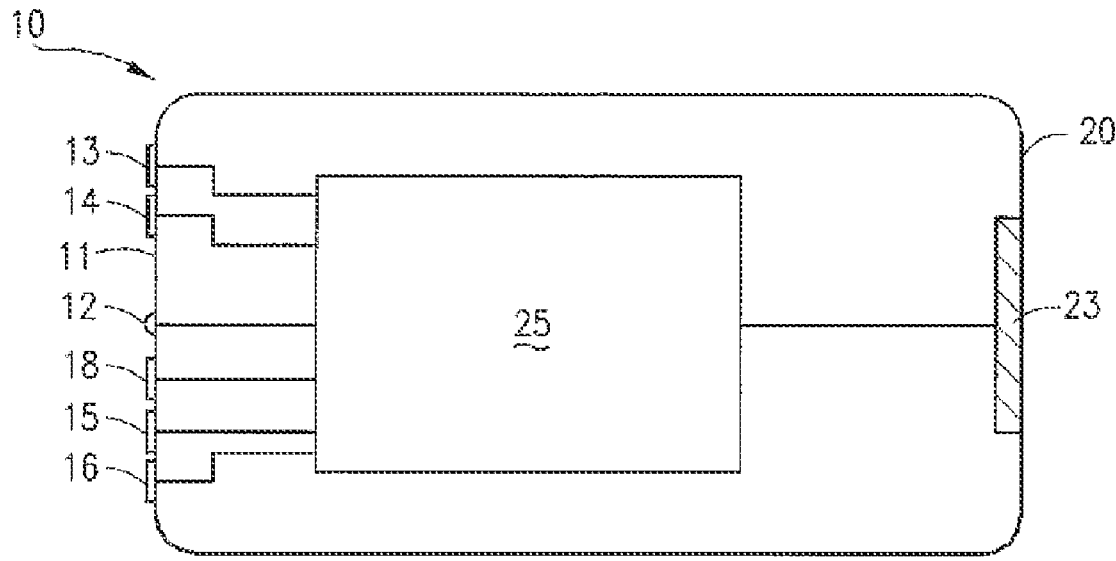

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 3 are determined to be patentable as amended.

Claim 2, dependent on an amended claim, is determined to be patentable.

1. A Voice over Internet Protocol (VoIP) telephone system that enables VoIP telephony and facsimile services allowing a user to gain access to telephone connectivity between an analog handset telephone and the internet, said system having multiple separate and independent internet access connections for connecting to the internet, each separate internet connection selectable by the user comprising:
   an analog telephone for transmitting and receiving sound;
   an analog telephone adapter (ATA) comprising a rigid housing, said housing containing a central processor, a non-transitory storage medium, a memory source, a network interface card (NIC), said ATA housing having at least one USB port, an Internet input, and a telephone port;
   said analog telephone connected to said ATA telephone port for transmission and receipt of electronic signals from the ATA;
   said ATA being configured *for multiple separate and independent internet access connections wherein each of the separate internet connections is selectable by the user,*
   *said ATA providing plug-in-play functionality, wherein the plug-in-play functionality allows the ATA to auto configure to operate using an independent internet access connection selected by the user; and*
   *wherein the plug-in-play functionality allows the ATA to auto configure to use an internet access connection without a computer connection; and*
   *wherein the internet connection provided by the ATA comprises a multi-port plug-in-play approach,* to optionally be connected by a user to either a first internet access connection or a second different internet access connection *or third different internet access connection* and to a switched telephone network through the internet such that it can transmit and receive telephone calls[;] *without the analog telephone being wired through a PSTN,*
   *wherein the ATA automatically detects a type of internet connection selected by the user, which connection is automatically detected without a computer connection; and*
   *wherein the ATA auto configures to operate using the user selected internet connection;*
   said system having said first internet access connection including said ATA connected to a computer, a USB cord connected to said computer and to said USB port in said analog telephone adapter, a modem connected to said computer, and said modem connected to said internet;
   said system having said second different internet access connection including said ATA connected to a USB electronic plug adapter, a USB plug cord connected to said USB plug adapter and said analog telephone adapter (ATA) USB port, an Ethernet cord, a router connected directly or indirectly to said Ethernet cord, said analog telephone adapter connected to said Ethernet cord, said modem connected to said internet, said analog telephone adapter powered by said USB plug adapter; and
   said system having said third different internet access connection including said ATA connected to a wireless router connected to the internet, Wi-Fi adapter connected to said analog telephone adapter including the analog telephone adapter NIC component, a USB electric plug adapter connected to said analog telephone adapter to provide power; and
   whereby a user of said analog telephone can call other telephone handset users over the internet using said first internet access connection or said second internet access connection or said third internet access connection using said ATA.

3. A Voice over Internet Protocol (VoIP) telephone system that enables VoIP telephony and facsimile services allowing a user to gain access to telephone connectivity between an analog handset telephone and the internet, said system having multiple separate and independent internet access connections for connecting to the internet, each separate internet connection selectable by the user comprising:
   an analog telephone for transmitting and receiving sound;
   an analog telephone adapter (ATA) comprising a rigid housing, said housing containing a central processor, a non-transitory storage medium, a memory source, a network interface card (NIC), said ATA housing having at least one USB port, an Internet input, and a telephone port;
   said analog telephone connected to said ATA telephone port for transmission and receipt of electronic signals from the ATA;
   said ATA being configured *for multiple separate and independent internet access connections wherein each of the separate internet connections is selectable by the user,*
   *said ATA providing plug-in-play functionality, wherein the plug-in-play functionality allows the ATA to auto configure to use an Internet access connection selected by the user; and*
   *wherein the plug-in-lay functionality allows the ATA to auto configure to use an internet access connection without a computer connection; and*
   *wherein the Internet connection provided by the ATA comprises a multi-port plug-in-play approach,* to optionally be connected by a user to either a first internet access connection or a second different internet access connection and to a switched telephone network through the internet such that it can transmit and receive telephone calls from other telephone handsets[;] *without the analog telephone being wired through a PSTN,*
   *wherein the ATA automatically detects a type of internet connection selected by the user, which connection is automatically detected without a computer connection; and*
   *wherein the ATA auto configures to operate using the user selected Internet connection;*
   said system having said first internet access connection including said ATA connected to a computer, a USB cord connected to said computer and to said USB port in said analog telephone adapter, a modem connected to said computer, and said modem connected to said internet;

said system having said second different internet access connection including said ATA connected to a USB electronic plug adapter, a USB plug cord connected to said USB plug adapter and said analog telephone adapter (ATA) USB port, an Ethernet cord, a router connected directly or indirectly to said Ethernet cord, said analog telephone adapter connected to said Ethernet cord, said modem connected to said internet, said analog telephone adapter powered by said USB plug adapter; and whereby a user of said analog telephone can call other telephone handset users over the internet using said first internet access connection or said second internet access connection using said ATA.

\* \* \* \* \*